Oct. 30, 1951  J. W. FRENCH  2,573,560
METHOD OF ALIGNING AND MOUNTING BINOCULAR TELESCOPES
Filed Nov. 6, 1946  2 SHEETS—SHEET 1
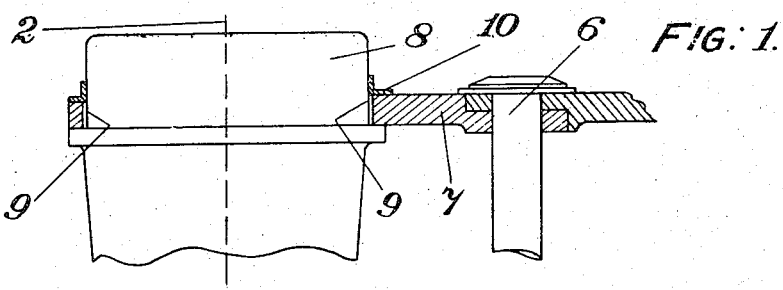
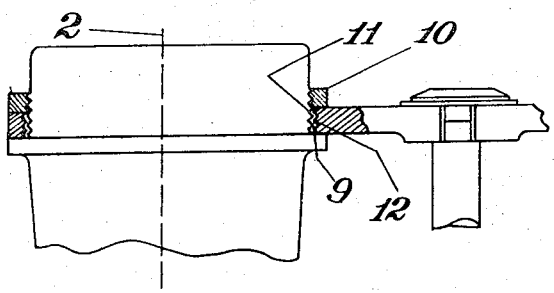
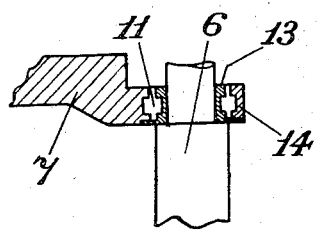
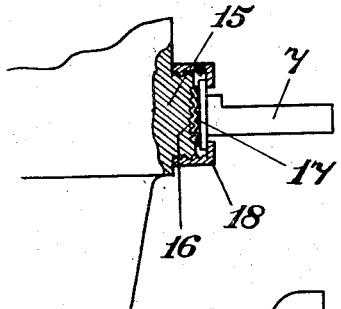
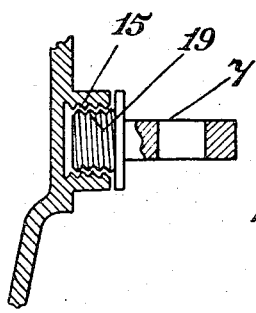
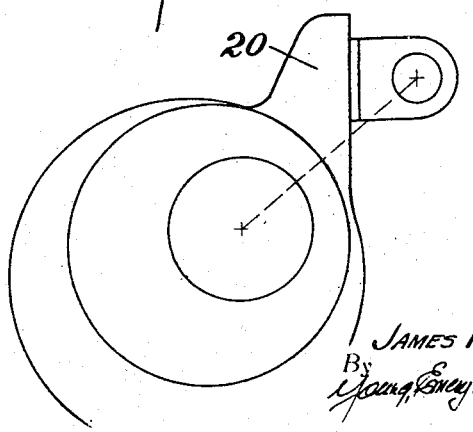
Inventor
JAMES W. FRENCH
By Young, Emery & Thompson
Attorneys

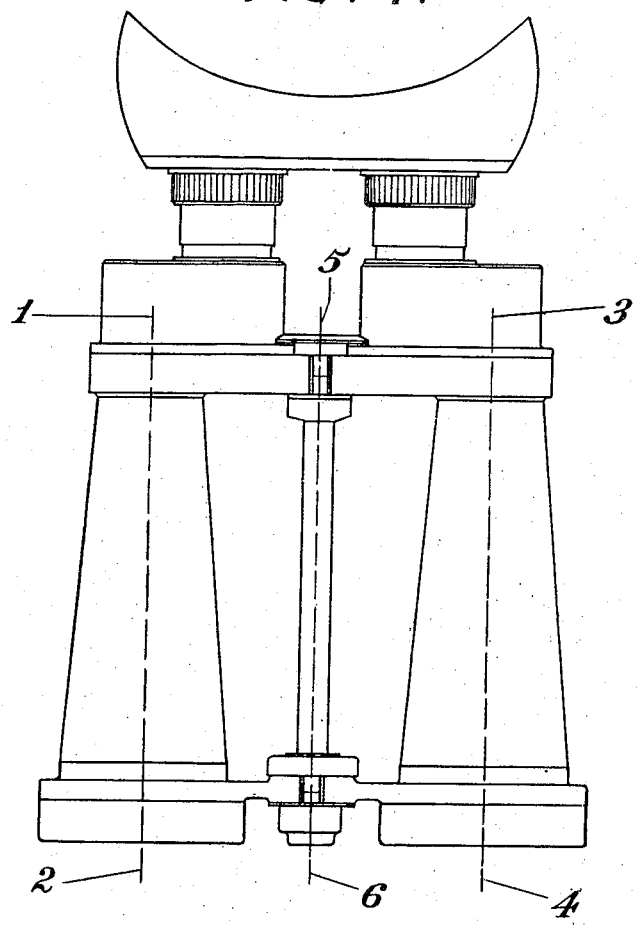
FIG: 7.
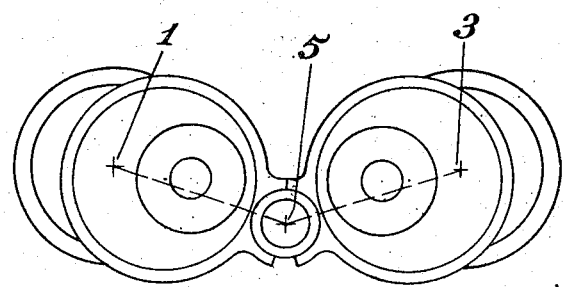
FIG: 8.
Inventor
JAMES W. FRENCH
By
Young, Emery & Thompson
Attorney

UNITED STATES PATENT OFFICE 2,573,560

METHOD OF ALIGNING AND MOUNTING BINOCULAR TELESCOPES

James Weir French, Glasgow, Scotland, assignor to Barr & Stroud, Limited, Glasgow, Scotland Application November 6, 1946, Serial No. 708,052
In Great Britain February 12, 1944

Section 1, Public Law 690, August 8, 1946
Patent expires February 12, 1964

3 Claims. (Cl. 88—34)

This invention refers to binocular observation instruments in which adjustment of the eyepiece separation to suit the interocular distance of the observer is effected by relative rotation of the two limbs of the binocular about a hinge or common axis, or parallel axes, one for each limb, such instruments being hereinafter referred to as of the hinging interocular adjustment type.

In such a binocular, if the optical axis of one limb is parallel to the axis of the hinge about which it rotates there will be no deviation from parallelism with respect to the hinge during the rotation and if both limbs are similarly adjusted, each with respect to its hinge, the alignment of the optical axes will not alter when the interocular distance is varied to suit the observer as would otherwise be the case. Correct alignment may be effected by the adjustment of the optical axis with reference to the limb and associated hinge or alternatively of the limb containing a fixed optical axis, with respect to the hinge. The former method is the one customarily adopted; the objective or eyepiece or prism combination being translated or rotated for the purpose in the required direction normal to the optical axis and thereafter being secured in position.

An object of this invention is to provide in a binocular observation instrument of the hinging interocular adjustment type, means whereby the optical axes of the limbs may be adjusted into parallelism with the hinge axis independently of any adjustment of the optical parts determining the optical axes.

Some examples of construction in accordance with the invention will now be described with reference to the drawings in which—

Figure 1 shows the objective end of one limb of a binocular instrument illustrating one construction, Figure 2 shows the objective end of one limb of a binocular instrument illustrating a second construction, Figures 3, 4 and 5 show details of three further constructions, Figure 6 shows a further construction, Figures 7 and 8 are a plan and an eyepiece end elevation, respectively, of a binocular as a whole.

Referring firstly to Figures 7 and 8, the optical axis of the left hand limb of the binocular is denoted 1—2, the optical axis of the right hand limb is denoted 3—4, and the axis of the hinge about which both limbs are rotated for interocular adjustment purposes is denoted 5—6. That is to say, there is a left hand limb-and-hinge assembly, and a right hand limb-and-hinge assembly, the hinge pin being common to both assemblies.

An intermediate piece having two hinges parallel to one another may be substituted for the single hinge 5—6 which however is the arrangement most commonly used.

If the axis 1—2 is not parallel to the hinge axis 5—6, its component inclinations in the horizontal and vertical planes will vary as the two limbs are rotated about the hinge, see Figure 8. The deviation when magnified by the optical system may be beyond the limit of parallelism adjustment of the observer's eye. It is essential, therefore, that both optical axes should be brought with considerable accuracy into parallelism with the hinge axis, about which they rotate for interocular adjustment. This may be effected by alteration of the distance between the axis and the hinge at the objective end, or the eyepiece end, or at both ends.

For purposes of description, adjustment applied at the objective end will alone be described as being applicable to both ends.

In Figure 1, 6 is the hinge pin, and 7 is the hinge arm of the objective end 8. A joint is provided between each arm and its corresponding limb, as follows: The arm 7 completely embraces the limb 8 leaving a clearance 9 sufficiently great to permit of the axis 2 of the limb 6 being adjusted in the required direction with respect to the arm 7 and therefore the axis 6. The clearance 9 is then filled with some suitable material as, for example, Wood's metal raised to a temperature, say, near the boiling point of water, and which, thereafter, solidifies thus preventing any relative movement of the limb 8 and the arm 7 and which could be removed when desired by immersion of the parts in boiling water. The cover ring 10 may be provided for the sake of appearance. Other materials which may be used for filling purposes are synthetic plastics which can be hardened by polymerisation, or materials of the air hardening type such as fish glue, resin and its compounds, or silicious cement such as porcelain and glass cements. Synthetic plastics are available which will remain sufficiently rigid under tropical heat conditions of, say, 160 degrees Fahrenheit.

At the eyepiece end the clearance 9 of a similar arrangement may be made almost a fit, the whole of the adjustment being provided at the window end, in which case the eyepiece arm may be mechanically pinned or otherwise secured to the limb or preferably any small space may be filled with the cement or other material. The clearance may be left at both the eyepiece and objective ends and be similarly filled. In carrying out the operation the hinge element 5—6 of Figure 7 may be held in a suitable jig provided with collimators or other optical axis determining gear mounted opposite the right and left limbs and adapted in the customary manner to provide a reference axis of adjustment for all interocular distance positions of the hinge limbs. Adjustment apparatus of this kind is well known.

There would, however, be provided in addition mechanical means for holding the limbs rigidly in position relatively to the hinge when the parallelism adjustment has been effected.

During the hardening of the cement, shrinkage of the material would not then alter the alignment. The shrinkage would adjust itself to the position of the elements.

In Figure 2 the limb surface 11 and the corresponding arm surface 12 are loosely screwed or corrugated, the better to retain the cement. The cover ring 10 may then be screwed into position and serve as an additional clamp.

In the particular arrangement of Figure 3, the joint is arranged so that the adjustment is effected at the hinge 6. The collar 13 associated with the hinge and the hinge portion 14 of the arm 7 are recessed as indicated to hold more securely the cement inserted in the clearance 11.

In Figure 4, the arm 7 is attached say to a boss 15 situated at the side of the limb. The boss may be corrugated as indicated at 16 and the end of the arm may have a head 17 provided also with corrugations. A securing ring 18 screwed on to the boss forms therewith a recess which embraces the head 17, a clearance being left between the walls of the recess and the head. Cement may be poured into the clearance within the securing ring through a suitable hole which thereafter may be plugged or covered.

In the arrangement, Figure 5, the arm 7 is provided with a corrugated or screwed end 19 which loosely fits the internal screw at the boss 15. When the cement is poured into the intervening clearance the parts are held rigidly together. It is not essential that the arms should be radial. The arrangement shown in Figure 5 may be secured to a tangential projection 20 from the body of the binocular, as shown in Figure 6.

I claim:

1. In the manufacture of a binocular instrument of the hinging interocular adjustment type including two limb-and-hinge assemblies and each limb mounting an eye lens and objective lens; a method of joining each limb to its hinge comprising forming co-operating formations on the limb and hinge, said formations defining an annular recess, adjusting the limb in the recess so that the optical axis of the limb is brought into parallelism with the hinge axis, and filling said recess with a pourable solidifiable filling material which on solidifying secures the limb in its adjusted position relative to the hinge axis.

2. In the manufacture of a binocular instrument of the type comprising two telescopes hingedly interconnected for interocular adjustment; a method of joining each telescope to the hinge comprising forming between the telescope and hinge a loose joint defining an annular recess, adjusting the telescope in the joint so that the optical axis of the telescope is brought into parallelism with the hinge axis, and filling said recess with a pourable solidifiable filling material which on solidifying secures the telescope in its adjusted position relative to the hinge axis.

3. In the manufacture of a binocular observation instrument of the hinging interocular adjustment type including two limb-and-hinge assemblies, each limb carrying an eye lens and objective lens; joining each limb to its hinge by a method comprising forming co-operating formations on the limb and hinge, said formations defining an annular recess, supporting the instrument at its hinge axis, locating optical axis determining gear including a reference adjustment axis opposite the limbs of the instrument, adjusting the limb in the recess so that the optical axis of the limb is brought into parallelism with the hinge axis, and filling the recess with a pourable solidifiable filling material which on solidifying secures the limb in its adjusted position relative to the hinge axis.

JAMES WEIR FRENCH.

REFERENCES CITED

The following references are of record in the file of this patent:

UNITED STATES PATENTS

| Number | Name | Date |
|---|---|---|
| 959,739 | Heckel | May 31, 1910 |
| 1,358,721 | Fujii | Nov. 16, 1920 |
| 1,722,520 | Glancy | July 30, 1929 |
| 2,097,850 | Wallace | Nov. 2, 1937 |
| 2,351,471 | Bailey | June 13, 1944 |
| 2,421,805 | Peck | June 10, 1947 |

FOREIGN PATENTS

| Number | Country | Date |
|---|---|---|
| 22,933 | Great Britain | of 1907 |
| 160,935 | Great Britain | Mar. 31, 1921 |
| 646,188 | France | July 10, 1928 |
| 292,470 | Great Britain | Oct. 14, 1929 |